US008473545B2

(12) United States Patent
McLaughlin (10) Patent No.: US 8,473,545 B2
(45) Date of Patent: Jun. 25, 2013

(54) DISTRIBUTING PRESENCE INFORMATION (75) Inventor: Mark McLaughlin, Woking (GB)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 12/455,153

(22) Filed: May 29, 2009

(65) Prior Publication Data

US 2010/0064014 A1    Mar. 11, 2010

(30) Foreign Application Priority Data

Sep. 5, 2008  (GB) .................................. 0816277.8

(51) Int. Cl.
*G06F 15/16*    (2006.01)

(52) U.S. Cl.
USPC .......................................... 709/203; 709/207

(58) Field of Classification Search
USPC ................ 709/207, 204, 227, 203; 455/414.2
See application file for complete search history.

(56) References Cited

U.S. PATENT DOCUMENTS

| 6,061,794 | A  | * | 5/2000  | Angelo et al. ..................... 726/3 |
| 6,697,840 | B1 | * | 2/2004  | Godefroid et al. ............. 709/205 |
| 6,747,970 | B1 | * | 6/2004  | Lamb et al. ..................... 370/352 |
| 6,920,478 | B2 | * | 7/2005  | Mendiola et al. ............. 709/203 |
| 7,020,480 | B2 | * | 3/2006  | Coskun et al. ................. 455/466 |
| 7,281,251 | B2 | * | 10/2007 | Otsuka et al. ................. 719/313 |
| 7,337,210 | B2 | * | 2/2008  | Barsness ........................ 709/204 |
| 7,555,108 | B2 | * | 6/2009  | Sylvain .................... 379/207.02 |
| 7,562,116 | B2 | * | 7/2009  | Barsness ........................ 709/204 |
| 7,620,404 | B2 | * | 11/2009 | Chesnais et al. ............ 455/456.1 |
| 7,711,810 | B2 | * | 5/2010  | McKinnon et al. ........... 709/224 |
| 7,747,679 | B2 | * | 6/2010  | Galvin et al. ................. 709/203 |
| 8,027,448 | B2 | * | 9/2011  | Jorasch et al. ........... 379/210.02 |
| 2002/0069249 | A1 | * | 6/2002 | Pedersen ....................... 709/204 |
| 2002/0095495 | A1 | * | 7/2002 | Otsuka et al. ................. 709/224 |
| 2003/0014490 | A1 | * | 1/2003 | Bates et al. .................... 709/206 |

(Continued)

FOREIGN PATENT DOCUMENTS

EP    1 720 124 A1    11/2006
GB    2459332          10/2009

(Continued)

OTHER PUBLICATIONS

Notification of Transmittal of the International Search Report and the Written Opinion of the International Searching Authority, or the Declaration, dated Feb. 12, 2009, for International Application No: PCT/EP2009/061414, consisting of 13 pages.

(Continued)

*Primary Examiner* — Firmin Backer
*Assistant Examiner* — Michael A Chambers
(74) *Attorney, Agent, or Firm* — Wolfe-SBMC (57) ABSTRACT

A method of distributing availability information from a first user terminal to at least one further user terminal connected via a communication network, comprising: executing a communication client at the first user terminal; the communication client accessing schedule data stored on a storage means relating to a user of the first user terminal; the communication client analysing the schedule data to determine a current status of the user; mapping the current status of the user to a selected one of a group of predefined availability settings at the communication client; and transmitting a message comprising the selected availability setting over the communication network to the at least one further user terminal.

20 Claims, 6 Drawing Sheets

U.S. PATENT DOCUMENTS

| | | | |
|---|---|---|---|
| 2003/0046296 A1* | 3/2003 | Doss et al. | 707/102 |
| 2003/0163697 A1* | 8/2003 | Pabla et al. | 713/171 |
| 2004/0117443 A1* | 6/2004 | Barsness | 709/204 |
| 2004/0203659 A1* | 10/2004 | Mikan | 455/414.1 |
| 2005/0038876 A1* | 2/2005 | Chaudhuri | 709/219 |
| 2005/0050143 A1* | 3/2005 | Gusler et al. | 709/206 |
| 2006/0075091 A1* | 4/2006 | Beyda et al. | 709/224 |
| 2006/0090137 A1* | 4/2006 | Cheng et al. | 715/758 |
| 2006/0253593 A1* | 11/2006 | Jachner | 709/227 |
| 2007/0027921 A1* | 2/2007 | Alvarado et al. | 707/104.1 |
| 2007/0081519 A1* | 4/2007 | Ramaswamy et al. | 370/352 |
| 2007/0168446 A1* | 7/2007 | Keohane et al. | 709/207 |
| 2007/0271129 A1* | 11/2007 | Dutton et al. | 705/8 |
| 2008/0082620 A1* | 4/2008 | Barsness | 709/207 |
| 2008/0102802 A1* | 5/2008 | Do et al. | 455/414.2 |
| 2008/0162632 A1* | 7/2008 | O'Sullivan et al. | 709/204 |

FOREIGN PATENT DOCUMENTS

| | | |
|---|---|---|
| GB | 2459332 A | 10/2009 |
| GB | 2463106 | 3/2010 |
| WO | WO 2005/009019 A2 | 1/2005 |
| WO | WO 2005/055109 A1 | 6/2005 |
| WO | WO-2010026192 | 3/2010 |

OTHER PUBLICATIONS

Search Report issued in Great Britain Application No. GB0816277.8 dated Nov. 30, 2009 (1 page).

"Foreign Office Action", EP Application No. 09782574.9, (Mar. 21, 2012), 4 pages.

"Search Report", GB Application No. 0816277.8, (Nov. 30, 2009), 1 page.

* cited by examiner

| Time | Meeting | Status | Message |
|---|---|---|---|
| 9:00am | Meeting with CEO | DND | In a meeting until 10:00am |
| | | DND | In a meeting until 10:00am |
| | | DND | In a meeting until 10:00am |
| | | DND | In a meeting until 10:00am |
| 10:00am | | Away | Free from 10:00am |
| | | Online | Free until 12:30pm |
| | | Online | Free until 12:30pm |
| | | Online | Free until 12:30pm |
| 11:00am | | Online | Free until 12:30pm |
| | | Online | Free until 12:30pm |
| | | Online | Free until 12:30pm |
| | | Online | Free until 12:30pm |
| 12:00am | | Online | Free until 12:30pm |
| | | Away | In meetings from 12:30pm |
| | Lunch with sales manager | DND | In meetings until 4:00pm |
| | | DND | In meetings until 4:00pm |
| 1:00pm | | DND | In meetings until 4:00pm |
| | | DND | In meetings until 4:00pm |
| | | DND | In meetings until 4:00pm |
| | | DND | In meetings until 4:00pm |
| 2:00pm | | DND | In meetings until 4:00pm |
| | | DND | In meetings until 4:00pm |
| | Patent review meeting | DND | In meetings until 4:00pm |
| | | DND | In meetings until 4:00pm |
| 3:00pm | | DND | In meetings until 4:00pm |
| | | DND | In meetings until 4:00pm |
| | | DND | In meetings until 4:00pm |
| | | DND | In meetings until 4:00pm |
| 4:00pm | | Away | Free from 4:00pm |
| | | Online | Free until 5:00pm |
| | | Online | Free until 5:00pm |
| | | Away | In a meeting from 5:00pm |
| 5:00pm | Weekly team update | DND | In a meeting until 6:00pm |
| | | DND | In a meeting until 6:00pm |
| | | DND | In a meeting until 6:00pm |
| | | DND | In a meeting until 6:00pm |
| 6:00pm | | Away | Free from 6:00pm |
| | | Online | <not set> |

FIG. 6

DISTRIBUTING PRESENCE INFORMATION

RELATED APPLICATION

This application claims priority under 35 U.S.C. §119 or 365 to Great Britain Application No. 0816277.8, filed Sep. 5, 2008. The entire teachings of the above application are incorporated herein by reference.

This invention relates to distributing presence information.

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), voicemail and file transfer.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

One of the advantages of packet-based communication systems, compared to the public switched telephone network ("PSTN"), is that presence information can be provided for the users. Presence information is a user-defined indication of the current status of the user of the system. Presence information is displayed in the user interface of the client for each of the contacts that the user has stored, and allows the user to view the current user-defined status of the contacts in the system. Example presence states that may be displayed include "online", "offline", "away", and "do not disturb".

The use of presence states provides a user with a best-guess regarding the current state of a contact before attempting to communicate with the contact. For example, if the user's presence state indicates the user is not online, and therefore unable to be contacted, then this is indicated to the user before attempting to make a call. Similarly, if a contact is busy and unlikely to answer, then this may also be communicated in advance via the contact's presence state (by the contact setting the appropriate presence state). This is a considerable advantage over PSTN systems, which do not provide any prior information on the probable state of a user. The only option in PSTN systems is to dial a number and wait and see if it is answered.

A problem with presence information is that it is must be set by the user of the packet-based communication system. In order for the presence state to accurately reflect the status of the user, the user must remember to regularly update his presence state. Frequently, the user can forget to do this, leading to inaccurate or inappropriate presence states being displayed to a user's contacts. Furthermore, the information provided by the presence status is limited, and only provides a "snapshot" of the user's status at the time at which the presence status is set.

There is therefore a need for a technique to address the aforementioned problems with presence states inaccurately reflecting the status of a user.

According to one aspect of the present invention there is provided a method of distributing availability information from a first user terminal to at least one further user terminal connected via a communication network, comprising: executing a communication client at the first user terminal; the communication client accessing schedule data stored on a storage means relating to a user of the first user terminal; the communication client analysing the schedule data to determine a current status of the user; mapping the current status of the user to a selected one of a group of predefined availability settings at the communication client; and transmitting a message comprising the selected availability setting over the communication network to the at least one further user terminal.

Because the availability settings are set in dependence on the schedule data relating to the user, the communication client is able to automatically determine an appropriate availability setting for the user's current situation. This provides more accurate availability (presence state) information, without the user needing to regularly manually update his availability.

Preferably, the method further comprises the step of searching the storage means for schedule data prior to the step of analysing. Preferably, the method further comprises the steps of: receiving schedule data entered into a calendar application executed at the first user terminal from the user of the first user terminal; and the calendar application storing the schedule data on the storage means. Preferably, the method further comprises the step of updating a user interface of the communication client to display the selected availability setting. Preferably, the steps of accessing, analysing and mapping are performed periodically.

Preferably, the step of mapping comprises the steps of: determining if the current status of the user is busy, and if so selecting an availability setting which prevents the user from being notified of incoming communication events; and determining if the current status of the user is free, and if so selecting an availability setting which permits the user to be notified of incoming communication events.

Preferably, the step of mapping comprises the step of: determining if the schedule data indicates that the current status of the user is scheduled to change within a predefined time period, and if so selecting an availability status which permits the user to be notified of incoming communication events and indicates limited availability of the user of the first user terminal.

Preferably, the step of mapping comprises the step of: determining if the schedule data indicates that the current status of the user has changed within a predefined time period, and if so selecting an availability status which permits the user to be notified of incoming communication events and indicates limited availability of the user of the first user terminal.

Preferably, the method further comprises the step of the communication client generating text data to augment the selected availability setting, and wherein the message transmitted to the at least one further user terminal further comprises the text data.

In one embodiment, the text data comprises a time at which the current status of the user is next scheduled to change. In another embodiment, the text data comprises a time at which the current status of the user has changed. Preferably, the method further comprises the step of analysing the schedule data to determine a classification of the current status of the user, and wherein the text data further comprises the classification.

In one embodiment, the step of transmitting is performed responsive to a request message received from the at least one further user terminal. In another embodiment, the step of transmitting is performed at periodic intervals.

According to another aspect of the invention there is provided a computer program product comprising program code means which, when executed by a computer implement the steps according to the above method.

According to another aspect of the invention there is provided a user terminal comprising: a storage means; and a processor configured to execute a communication client, wherein the communication client is programmed so as when executed to allow a user of the user terminal to establish communications with at least one further user terminal via a packet-based communication network; and wherein the communication client is arranged to access schedule data stored on the storage means relating to the user of the user terminal, analyse the schedule data to determine a current status of the user, map the current status of the user to a selected one of a group of predefined availability settings, and transmit a message comprising the selected availability setting over the communication network to the at least one further user terminal.

Preferably, the communication client is further arranged to search the storage means for schedule data prior to analysing the schedule data. Preferably, the processor is further configured to execute a calendar application, wherein the calendar application is arranged to receive schedule data entered by the user of the user terminal and store the schedule data on the storage means.

Preferably, the user terminal further comprised a display means, wherein the communication client is arranged to update a user interface displaying the selected availability setting on the display means.

Preferably, the communication client is arranged to periodically access the schedule data, analyse the schedule data, and map the current status of the user to a selected one of a group of predefined availability settings. Preferably, the communication client step is arranged to determine if the current status of the user is busy, and if so select an availability setting which prevents the user from being notified of incoming communication events, and determine if the current status of the user is free, and if so select an availability setting which permits the user to be notified of incoming communication events.

Preferably, the communication client is further arranged to determine if the schedule data indicates that the current status of the user is scheduled to change within a predefined time period, and if so select an availability status which permits the user to be notified of incoming communication events and indicates limited availability of the user of the user terminal.

Preferably, the communication client is further arranged to determine if the schedule data indicates that the current status of the user has changed within a predefined time period, and if so select an availability status which permits the user to be notified of incoming communication events and indicates limited availability of the user of the user terminal.

Preferably, the communication client is further arranged to generate text data to augment the selected availability setting, and wherein the message transmitted to the at least one further user terminal further comprises the text data.

Preferably, the communication client is further arranged to analyse the schedule data to determine a classification of the current status of the user, and wherein the text data further comprises the classification.

In one embodiment, the communication client is arranged to transmit the message comprising the selected availability setting responsive to a request message being received from the at least one further user terminal. In another embodiment, the communication client is arranged to transmit the message comprising the selected availability setting at periodic intervals.

Preferably, the communication network is a packet-based communication network. In one embodiment, the communication network is a voice over internet protocol network. In another embodiment, the communication network is an instant messaging network. Preferably, the communication network is a peer-to-peer communication network.

For a better understanding of the present invention and to show how the same may be put into effect, reference will now be made, by way of example, to the following drawings in which.

Figure 1:
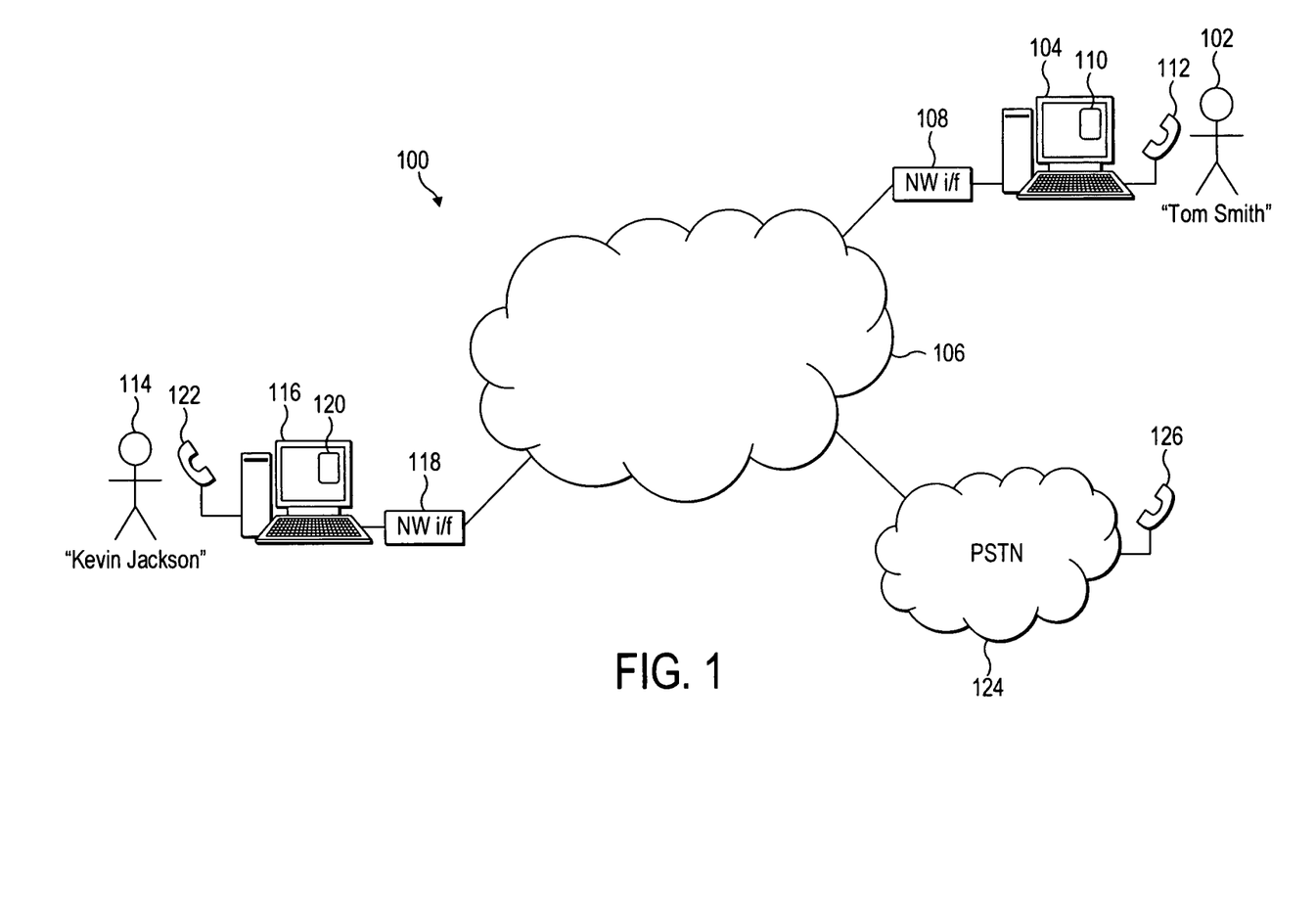
FIG. 1 shows a packet-based communication system.

Reference is first made to FIG. 1, which illustrates a packet-based communication system 100. Note that whilst this illustrative embodiment is described with reference to a P2P communication system, other types of communication system could also be used, such as non-P2P, VoIP or IM systems. A first user of the communication system (named "Tom Smith" 102) operates a user terminal 104, which is shown connected to a network 106. Note that the communication system 100 utilises a network such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user device 104 is arranged to receive information from and output information to a user of the device. In a preferred embodiment of the invention the user device comprises a display such as a screen and an input device such as a keyboard, mouse, joystick and/or touch-screen. The user device 104 is connected to the network 106 via a network interface 108 such as a modem, and the connection between the user terminal 104 and the network interface 108 may be via a cable (wired) connection or a wireless connection.

Note that in alternative embodiments, the user terminal 104 can connect to the communication network 106 via additional intermediate networks not shown in FIG. 1. For example, if the user terminal 104 is a mobile device, then it can connect to the communication network 106 via a mobile network (for example a GSM or UMTS network).

The user terminal 104 is running a communication client 110, provided by the software provider. The communication client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 104, or integrated into the user terminal 104 itself.

Figure 2:
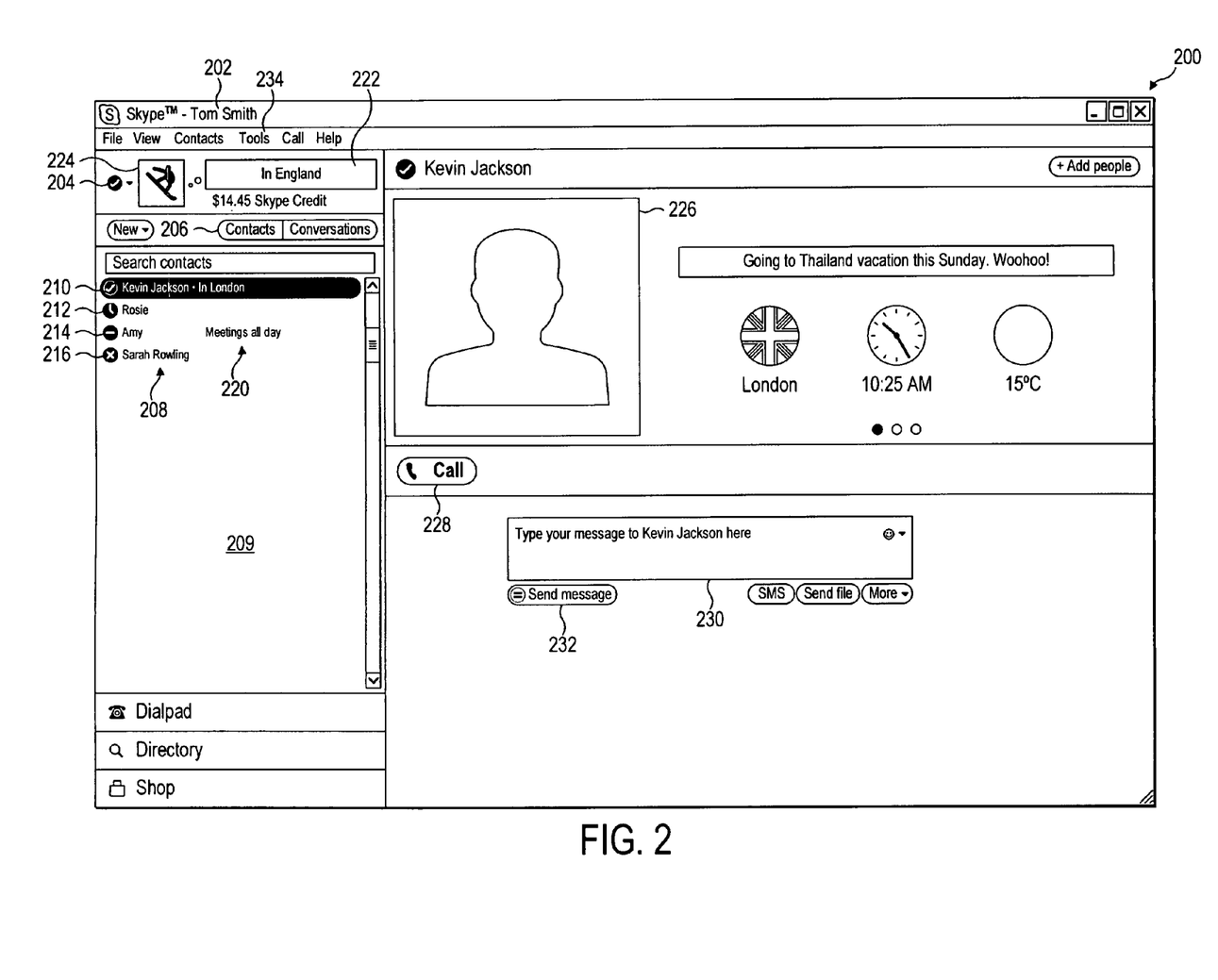
FIG. 2 shows a user interface of a communication client.

An example of a user interface 200 of the communication client 110 executed on the user terminal 104 of the first user 102 is shown illustrated in FIG. 2. Note that the user interface 200 can be different depending on the type of user terminal 104. For example, the user interface can be smaller or display information differently on a mobile device, due to the small screen size. In the example of FIG. 2, the client user interface 200 displays the username 202 of "Tom Smith" 102 in the communication system, and the user can set his own presence state (that will be seen by other users) using a drop down list by selecting icon 204.

The client user interface 200 comprises a button 206 labelled "contacts", and when this button is selected the contacts stored by the user in a contact list are displayed in a pane 209 below the button 206. In the example user interface in FIG. 2, four contacts of other users of the communication system are shown listed in contact list 208. Each of these contacts have authorised the user 102 of the client 110 to view their contact details and presence state. Each contact in the contact list has a presence status icon associated with it. For example, the presence status icon for "Kevin Jackson" 210 indicates that this contact is "online", the presence icon for "Maria Jones" 212 indicates that this contact is "away", the presence icon for "Roger White" 214 indicates that this contact's state is "do not disturb" ("DND"), the presence icon for "Sarah Rowling" 216 indicates that this contact is "offline". Further presence state indications can also be included.

Presence information in packet-based communication systems can additionally be supplemented by "mood messages". Mood messages are short text strings that are composed by the users to distribute information about themselves to their contacts and supplement their presence status. Mood messages can therefore be considered to be extended presence information. The mood message acts as a supplementary data channel between a user and all of his contacts for the simple distribution of text-based information. The mood message of a contact is generally displayed next to the contact's name and presence status in the client.

Mood messages are useful for a number of reasons. For example, a mood message can be used to give more information or a reason for a particular presence status, e.g. if a user is offline, the mood message may say "On holiday", thereby explaining why the user is offline. Similarly, if a user's presence state is set to "do not disturb", the mood message may say "Busy working. Only contact me if urgent". In FIG. 2, the mood messages 220 of the contacts are shown displayed next to the names of the contacts in pane 209.

The contact list for the users (e.g. the contact list 208 for "Tom Smith") is stored in a contact server (not shown in FIG. 1). When the client 110 first logs into the communication system the contact server is contacted, and the contact list is downloaded to the user terminal 104. This allows the user to log into the communication system from any terminal and still access the same contact list. The contact server is also used to store the user's own mood message (e.g. a mood message 222 of the first user 102) and a picture 224 selected to represent the user (known as an avatar). This information can be downloaded to the client 110, and allows this information to be consistent for the user when logging on from different terminals. The client 110 also periodically communicates with the contact server in order to obtain any changes to the information on the contacts in the contact list, or to update the stored contact list with any new contacts that have been added.

Presence state information is not stored centrally in the contact server. Rather, the client 110 periodically requests the presence state information for each of the contacts in the contact list 208 directly over the communication system. Similarly, the current mood message for each of the contacts, as well as a picture (avatar—e.g. picture 226 for "Kevin Jackson") that has been chosen to represent the contact, are also retrieved by the client 110 directly from the respective clients of each of the contacts over the communication system. The presence states of the contacts are therefore determined using a "pull" technique, as the data is requested from the clients of each of the contacts. In alternative embodiments, the presence state of a user can be "pushed" to each of the user's contacts over the communication network, either periodically or whenever the presence state is changed.

VoIP calls to the users in the contact list may be initiated over the communication system by selecting the contact and clicking on a "call" button 228 using a pointing device such as a mouse. Referring again to FIG. 1, the call set-up is performed using proprietary protocols, and the route over the network 106 between the calling user and called user is determined by the peer-to-peer system without the use of servers. For example, the first user "Tom Smith" 102 can call a second user "Kevin Jackson" 114.

Following authentication through the presentation of digital certificates (to prove that the users are genuine subscribers of the communication system—described in more detail in WO 2005/009019), the call can be made using VoIP. The client 110 performs the encoding and decoding of VoIP packets. VoIP packets from the user terminal 104 are transmitted into the network 106 via the network interface 108, and routed to a computer terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112.

The VoIP packets for calls between users (such as 102 and 114) as described above are passed across the network 106 only, and the public switched telephone network ("PSTN") 124 is not involved. Furthermore, due to the P2P nature of the system, the actual voice calls between users of the communication system can be made with no central servers being used. This has the advantages that the network scales easily and maintains a high voice quality, and the call can be made free to the users. Additionally, calls can also be made from the client (110, 122) using the packet-based communication system to fixed-line or mobile telephones 126, by routing the call to the PSTN network 124. Similarly, calls from fixed-line or mobile telephones 126 can be made to the packet-based communication system via the PSTN 124.

In addition to making voice calls, the user of the client 110 can also communicate with the users listed in the contact list 208 in several other ways. For example, an instant message (also known as a chat message) can be sent by typing a message in box 230 (as shown in FIG. 2) and sending it by selecting the "send message" button 232. Additionally, the first user 102 can use the client 110 to transmit files to users in the contact list 208, send voicemails to the contacts or establish video calls with the contacts (not illustrated in FIG. 2).

Figure 3:
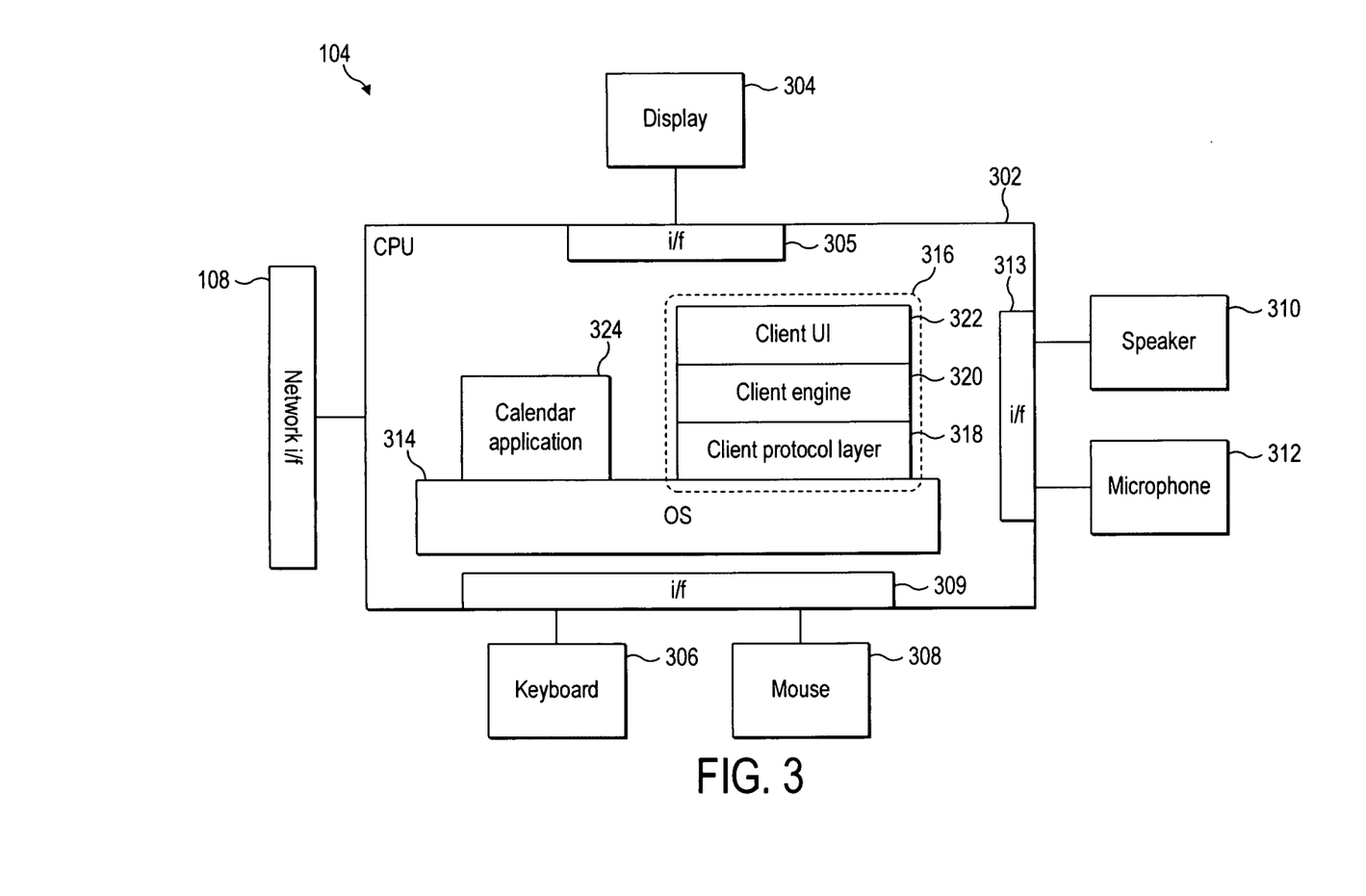
FIG. 3 shows a user terminal executing a communication client.

FIG. 3 illustrates a detailed view of the user terminal 104 on which is executed client 110. The user terminal 104 comprises a central processing unit ("CPU") 302, to which is connected a display 304 such as a screen via a display interface 305, an input device such as a keyboard 306 and a pointing device such as a mouse 308 connected via an interface 309 such as USB. In alternative terminals, the input devices and pointing device can be integrated into the terminal, such as a keypad, touch-screen and/or joystick. An output audio device 310 (e.g. a speaker) and an input audio device 312 (e.g. a microphone) are connected via an audio interface 313. The output audio device 310 and input audio device 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the communication system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

As stated previously, there exists a problem with presence information in packet-based communication systems such as that described above. The user of the communication client needs to manually set the presence state (for example using drop-down list 204 in FIG. 2) to a status that is appropriate for his current conditions. The user must remember to regularly update this presence state for it to be accurate. Often, the user can forget to do this, leading to inaccurate presence states being distributed and displayed to the user's contacts.

Calendar applications or personal information manager ("PIM") applications are widely used on user terminals. These applications are often used on a wide range of devices, including PCs (e.g. desktop and notebook/portable PCs) and mobile devices (e.g. mobile phones and PDAs). These applications allow the user to record schedules, appointments, meetings and important dates in an electronic calendar. The calendar data is therefore a useful resource providing information on the behaviour of the user of the user terminal.

FIG. 3 illustrates a calendar application 324 executed on the OS 314 of the user terminal 104. The calendar application is arranged to display a calendar user interface to the user of the user terminal 104 on the display 304. The user of the user terminal 104 can enter schedule/appointment data into the calendar application using the input device 306 and pointing device 308. The schedule data for the calendar application is preferably stored at the user terminal 104. For example, the schedule data can be stored on a hard disk drive of the user terminal, in non-volatile memory (such as flash memory), in volatile memory (such as DRAM), or a combination thereof. The manner and location of the storage of the calendar data depends upon the type of device on which the calendar application is executed, and is not shown in FIG. 3. In alternative embodiments, the calendar data is not stored at the user terminal 104, but is stored on a remote server. In this case the calendar application transmits the schedule data from the user terminal 104 to the remote server for storage.

The schedule data produced by the calendar application as a result of the user entering information into the calendar application can be used by the communication client to automatically determine an appropriate presence state for the user's current situation. This is advantageous because it provides more accurate presence state information, without the user needing to regularly manually update his presence state. Furthermore, additional advantages arise due to the schedule data providing information regarding the user's expected future behaviour.

Figure 4:
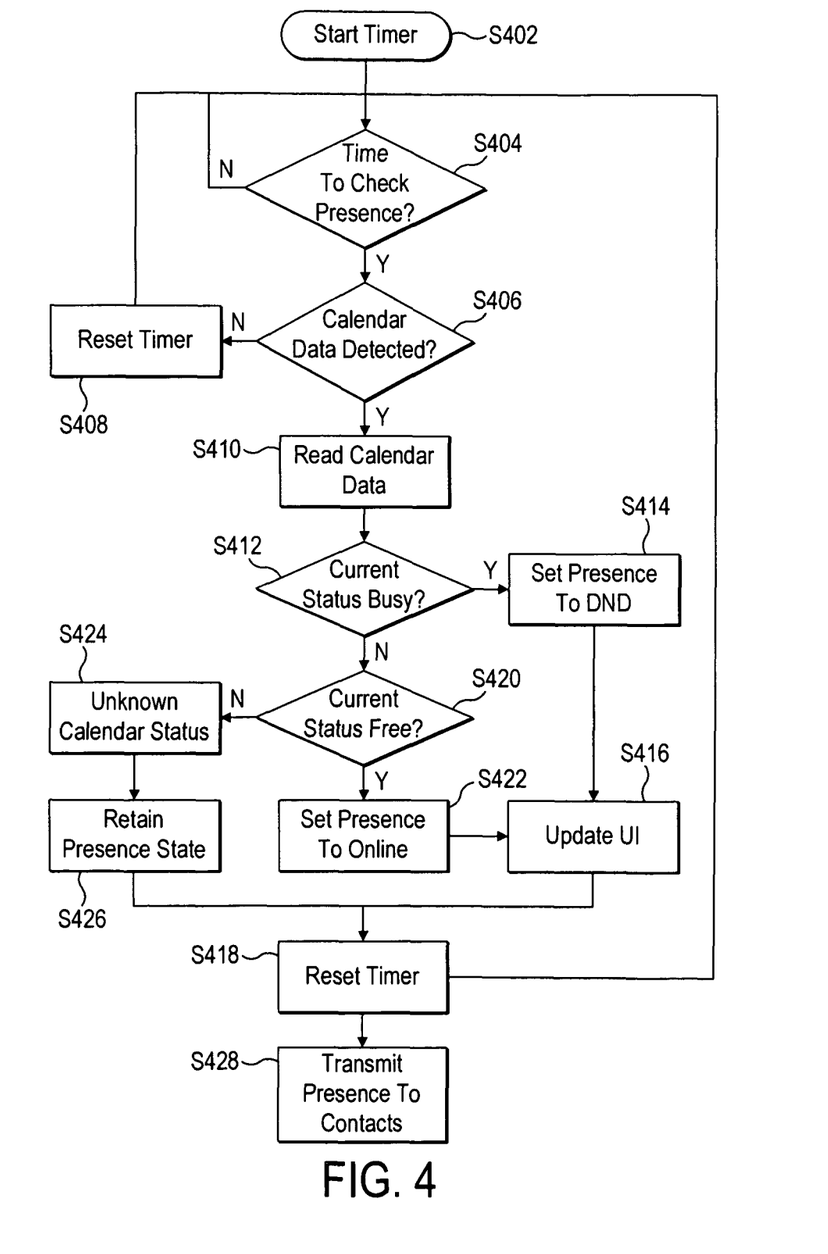
FIG. 4 shows a flowchart of a process for automatically setting a presence state.

Reference is now made to FIG. 4, which illustrates a flowchart of a process for the communication client 316 to automatically set the presence state of a user in dependence on user schedule data. The process is executed by the client engine layer 320.

In step S402, the process executed by the communication client 316 begins by starting a timer that defines the periodic interval at which the client 316 should check the current presence state. Note that this periodic interval can be predefined in the communication client, or set by the user. In step S404, the client determines whether the time limit has expired, such that it is time to check whether the presence state should be updated. In this way, the client 316 periodically checks whether the presence state needs to be updated. If it is not time to check the presence state in S404, then the process is repeated. If it is time to check the presence state, then in step S406 the client 316 determines whether schedule data can be detected.

As stated above, the schedule data can be located in different storage devices, depending on the type of user terminal and the calendar application. The client 316 searches for the schedule data in the appropriate place for the particular terminal in question. In some embodiments the client 316 can determine whether a PIM application is currently being executed on the user terminal, and use this to determine whether calendar data is present. In other embodiments, the communication client can make use of a calendar application programming interface ("API") provided by the PIM application to access calendar data whether or not the PIM application is being executed at a given time. Alternatively, the client 316 can be configured to search one or more storage locations regardless of whether a PIM application is being executed.

If schedule data is not detected at the user terminal (or, in alternative embodiments, on a remote server) then the timer is reset in S408, control returns to S404, and the client waits for the next periodic interval before checking again. If schedule data is detected in step S406, then in step S410 the schedule data is read by client 316. The schedule data is read from its storage location, as described above. Preferably, a copy of at least a relevant portion of the schedule data is stored in memory on the user terminal 104 for the client 316 to utilise. For example, this can be stored in DRAM.

The schedule data is analysed by the client 316 in order to determine what the current status of the user is, according to the schedule data. This is achieved by the client accessing the current time on the user terminal (which can be maintained by the operating system 314 or in hardware) and using this to determine whether any events are contained in the schedule data for this time.

In step S412 it is determined whether the current status of the user extracted from the schedule data indicates that the user is busy. If this is the case, then in step S414, the client 316 sets the presence state for the user to "do not disturb". Note that it is possible that the client is already in this presence state (e.g. due to a previous automatic update or a manual setting by the user), in which case the presence state remains in this state.

The DND presence state not only indicates to the user's contacts that the user is busy and should not be disturbed, but also prevents the user of the client 316 from being notified of incoming communication events. Specially, when a user's presence state is set to DND, then all audio and visual indications of incoming communication events at the user's terminal are disabled. This ensures that, when the presence state is set to DND, the user is not disturbed by incoming communication events.

In step S416 the client engine layer 320 instructs the client UI layer 322 to update the user interface to reflect the change in presence state (if a change is being made). Specifically, the icon 204 in FIG. 2 is updated to show the DND icon. In step S418 the periodic timer for checking the presence state is reset, and control returns to step S404.

Returning again to step S412, if the schedule data indicates that the user not busy, then in step S420 the client 316 determines whether the current status of the user extracted from the schedule data indicates that the user is free. If this is the case, then in step S422 the presence state for the user is set to "online". The online presence state indicates to the user's contacts that the user is available for communication. As described above, the UI is then updated to show the new presence state (if changed) in step S416, and the interval timer is reset in step S418.

Returning again to step S420, if the current status is not free, then this indicates that the client 316 has been unable to determine from the schedule data that the user is either specifically busy or free. This indicates that either the schedule data could not be interpreted correctly, or that an error event has occurred. In this circumstance, the client 316 registers an unknown status for the user in step S424 and then retains the current presence state without change in step S426. The timer is then reset in step S418, and the process in FIG. 4 is repeated.

In step S428, the presence state for the user is transmitted to the contacts of the user. As mentioned, the presence state can be transmitted in response to a direct request from a particular contact, or the client 316 can be configured to periodically transmit the presence state to all the contacts. The time intervals at which the client 316 informs the contacts of the presence state of the user is not dependent on the time interval at which the current presence state is checked in FIG. 4.

The flowchart described in FIG. 4 therefore enables the client 316 to automatically set the presence state of the user in a packet-based communication system in dependence on data extracted from an electronic calendar.

Figure 5:
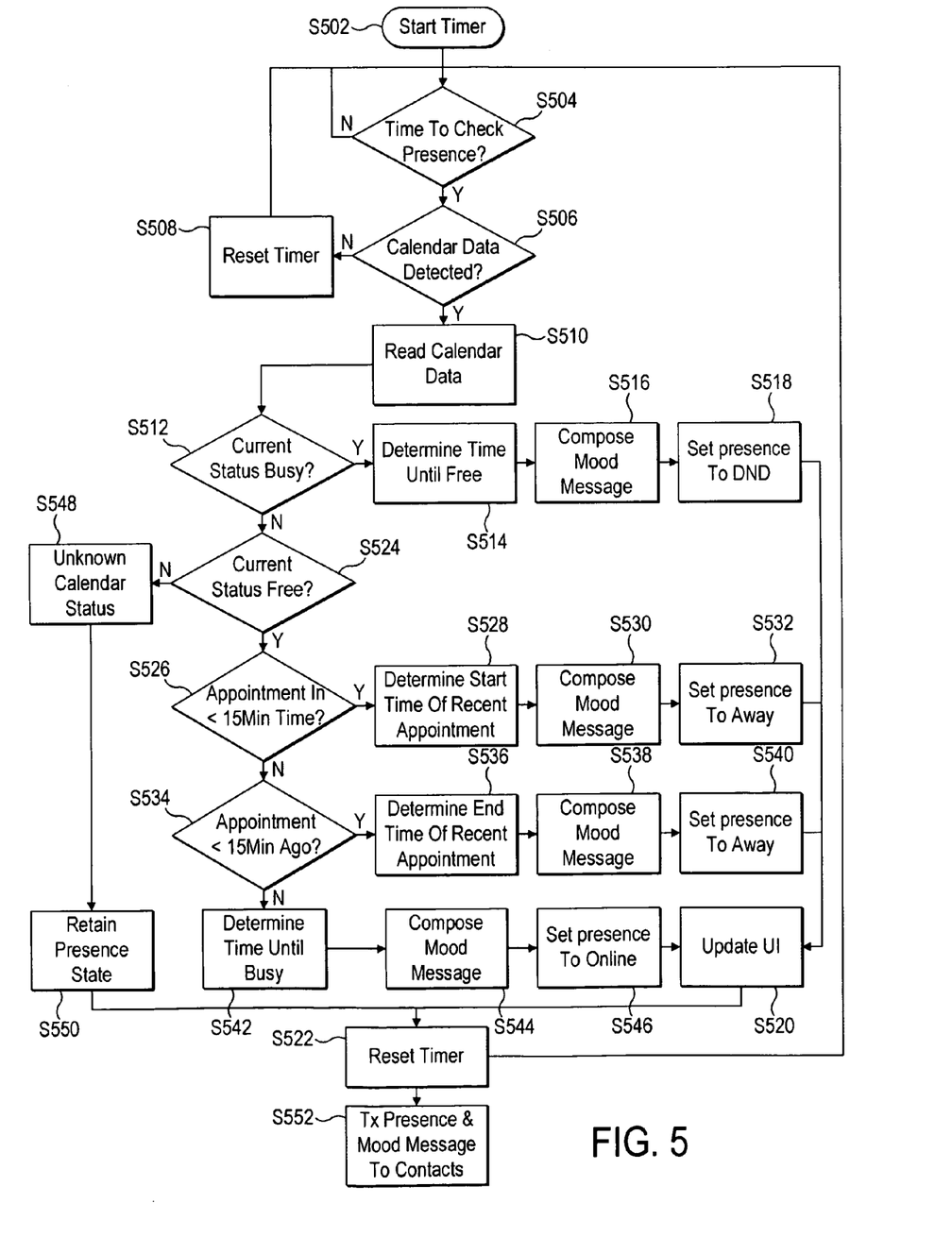
FIG. 5 shows a flowchart of a process for automatically setting a presence state and mood message information.

Reference is now made to FIG. 5, which illustrates a further embodiment of the invention. The flowchart in FIG. 5 is a process executed by the client 316 which can take into account schedule data indicating the user's future activities. In addition, the process of FIG. 5 makes use of the mood message functionality to provide extended presence information.

Steps S502 to S508 are the same as steps S402 to S410 described above with reference to FIG. 4. Specifically, in step S502, the communication client 316 start the timer defining the periodic interval at which the client 316 should check the current presence state. In step S504, the client determines whether the timer has expired. If it has not, then it is not time to check the presence state, and the process is repeated until it is determined in step S504 that that the timer has expired. In step S506 the client 316 determines whether schedule data can be detected in the storage locations as detailed above with reference to FIG. 4.

If schedule data is not detected at the user terminal (or, in alternative embodiments, on a remote server) then the timer is reset in S508, control returns to S504, and the client waits for the next periodic interval before checking again. If schedule data is detected in step S506, then in step S510 the schedule data is read by client 316. The schedule data is read from its storage location, as described above with reference to FIG. 4. Preferably, a copy of at least a relevant portion of the schedule data is stored in memory on the user terminal 104 for the client 316 to utilise. For example, this can be stored in DRAM.

The schedule data is analysed by the client 316 in order to determine what the current status of the user is, according to the schedule data. This is achieved by the client accessing the current time on the user terminal (which can be maintained by the operating system 314 or in hardware) and using this to determine whether any events are contained in the schedule data for this time.

In step S512 it is determined whether the current status of the user extracted from the schedule data indicates that the user is busy. If this is the case, then, in step S514, the schedule data is further analysed to determine the time at which the user will cease to be busy. For example, if the schedule data indicates that the user is in a meeting, then the client 316 can read from the schedule data the time at which the meeting is due to finish. Therefore, the client 316 determines the time at which user is scheduled to become free. This also takes into account multiple consecutive appointments in the schedule data, such that if the user has more than one appointment in a row, then the client 316 determines that time at which all the appointments are finished and the user is free again.

In step S516 the client 316 automatically composes a mood message to distribute the information regarding the user's schedule to the user's contacts. The mood message composed in S516 comprises the time at which the user is due to be free again. For example, if in S514 it was determined that the user was scheduled to be busy until 3:30 pm, then in S516 the composed mood message reads "In meetings until 3:30 pm". Alternative language could also be used. The generation of a mood message in this way acts as extended presence information which provides the contact's of the user with information about the user's expected future behaviour.

In step S518 the presence state for the user is set to DND, to reflect that schedule data indicates that the user is currently busy. In step S520 the client engine layer 320 instructs the client UI layer 322 to update the UI of the client 316 to show the presence state of DND, and to show the automatically generated mood message indicating the time at which the user is scheduled to be free. For example, the icon 204 and mood message 222 in FIG. 2 are updated. In step S522 the periodic timer for checking the presence state is reset, and control returns to step S504.

Returning again to step S512, if it is determined that the user is not busy, then in step S524 it is determined whether the schedule data indicates that the user is currently free. If the schedule data indicates that the user is currently free, then in step S526 the schedule data is analysed to determine whether the user is scheduled to become busy within a predetermined period of time. Preferably, the predetermined period of time is 15 minutes, although any suitable time period can be selected. The predetermined interval value can be user-defined.

If the user is scheduled to become busy within the predetermined time period, then in S528 the scheduled start time of the user's appointment is read from the schedule data. In step S530 a mood message is created which comprises the imminent start time of the user's appointment. For example, if the current time is 3:20 pm, and the user has an appointment scheduled for 3:30 pm, then the appointment is <15 minutes from the current time, and the client generates a mood message with the text "In a meeting from 3:30 pm". Alternative text could also be used that communicates similar information. In step S532 the presence state of the user is set to "away". The "away" presence state, combined with the mood message convey to the user's contacts that the user is in a transition period (in this example 15 minutes) in which he will imminently cease to be free, and is scheduled to be busy. This therefore indicates to the contacts that the user may still be contactable if required, but there is a significant likelihood that the user will not answer.

In step S520 the UI of the client is updated to show the "away" status and mood message. In step S522 the timer is reset and control returns to S504.

Returning again to step S526, if it is determined that the user is not scheduled to start an appointment in the predetermined time interval, then in step S534 it is determined whether the user has recently completed an appointment within a predetermined time interval. In other words, it is determined whether the user's schedule indicates that he has recently gone from being busy to being free. Preferably the predetermined time interval is 15 minutes, although any suitable time period can be used. The predetermined interval value can be user-defined.

In step S536, the client 316 reads the time at which the recently completed appointment was scheduled to finish. In step S538, a mood message is generated that comprises the time of the recently completed appointment. For example, if the current time is 4:05 pm and a meeting was scheduled to end at 4:00 pm, a mood message is generated that reads "Free from 4:00 pm". In step S540, the presence state of the user is set to "away". The "away" state and the mood message indicates to the user's contacts that the user was scheduled to have recently completed an appointment, and is therefore due to become free again. However, because the appointment ended recently, the user may be in transit from the appointment and therefore may not answer if contacted.

In step S520 the UI of the client is updated to show the "away" status and mood message. In step S522 the timer is reset and control returns to S504.

Returning again to S534, if the user was not scheduled to have recently completed an appointment within the predetermined time interval, then this indicates that the user is currently free and is neither about to become busy, nor has only recently become free. In step S542, the client 316 reads the schedule data to determine the time at which the user's next appointment is scheduled for. In other words, the client 316 determines the time at which the user is schedule to next be busy. In step S544 a mood message is generated that comprises the information on the time at which the user is due to become busy. For example, if the current time is 2:00 pm, and the next appointment for the user is at 3:30 pm, then the generated mood message reads "Free until 3:30 pm". Alternative language can also be used. If no future appointments are scheduled for the user, then no mood message is generated.

In step S546, the user's presence state is set to "online". This therefore indicates to the user's contacts that the user does not currently have any scheduled appointments, and is therefore likely to be contactable. Furthermore, it indicates the timescale over which the user is scheduled to remain in that state. In step S520 the UI of the client is updated to show the "online" status and mood message. In step S522 the timer is reset and control returns to S504.

Returning to step S524, if the current status is not free, then this indicates that the client 316 has been unable to determine from the schedule data that the user is either specifically busy or free. This indicates that either the schedule data could not be interpreted correctly, or that an error event has occurred. In this circumstance, the client 316 registers an unknown status for the user in step S548 and then retains the current presence state without change in step S550. The timer is then reset in step S522, and the process in FIG. 5 is repeated.

In step S552, the presence state for the user is transmitted to the contacts of the user. As mentioned, the presence state can be transmitted in response to a direct request from a particular contact, or the client 316 can be configured to periodically transmit the presence state to all the contacts. The time intervals at which the client 316 informs the contacts of the presence state of the user is not dependent on the time interval at which the current presence state is checked in FIG. 5.

Figure 6:
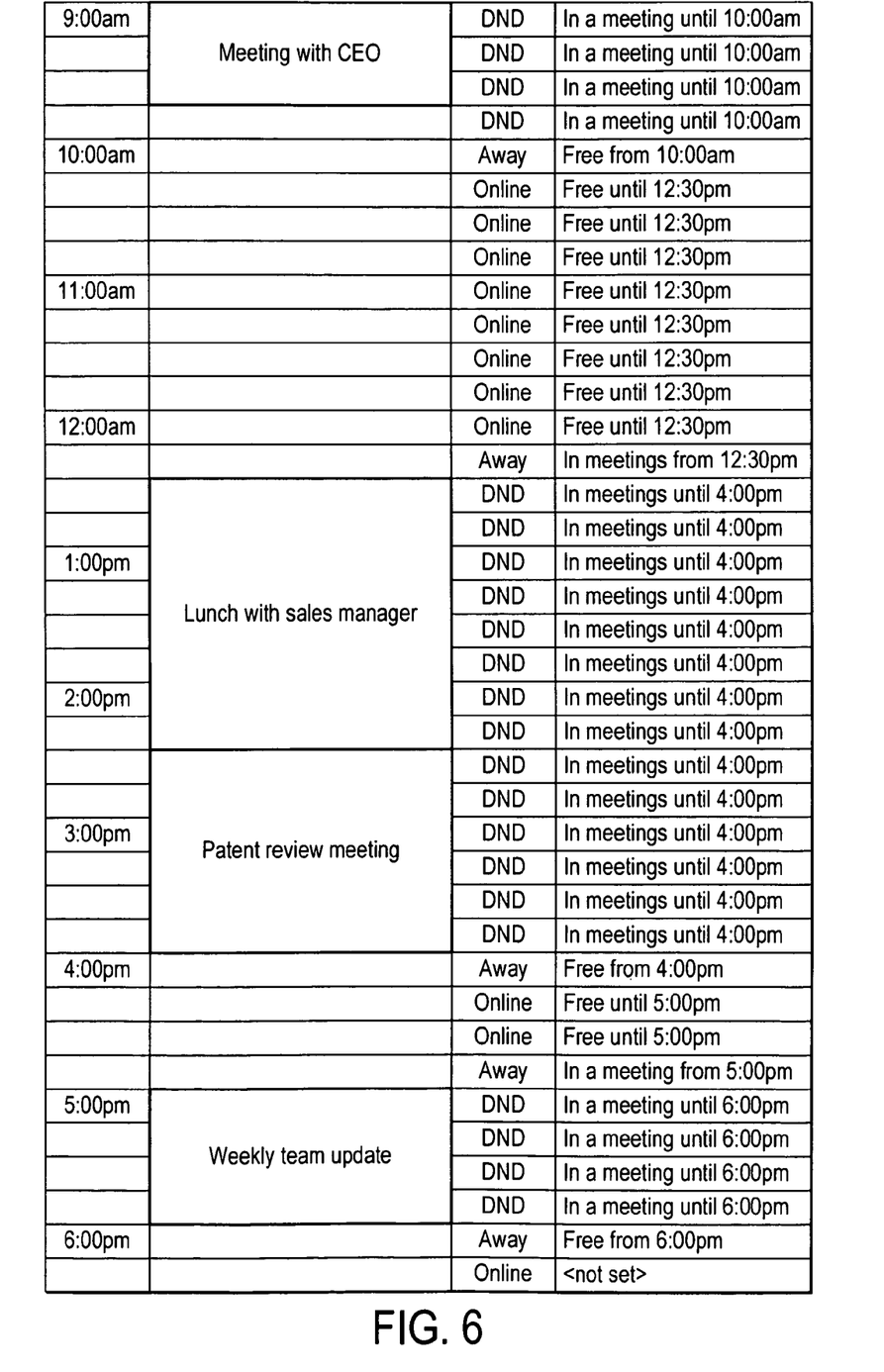
FIG. 6 shows an example of automatically generated presence states and mood messages.

Reference is now made to FIG. 6, which illustrates presence states and mood messages generated by the process of FIG. 5 for an example illustrative calendar of a user. FIG. 6 shows calendar entries that have been entered by a user ranging from 9:00 am to 6:15 pm for a particular day. Four appointments are scheduled for the user in this day. The predetermined time interval either side of an appointment at which the presence is set to "away" is 15 minutes.

The first appointment is scheduled for 9:00 am and is one hour long and due to finish at 10:00 am. The presence state for the user is therefore set to "DND", and the mood message reads "In a meeting until 10:00 am". Between 10:00 am and 10:15 am, the presence state is "away" and the mood message reads "Free from 10:00 am". The next appointment for the user is not until 12:30 pm, so from 10:15 am to 12:15 pm the presence status is "online" and the mood message reads "Free until 12:30 pm". At 12:15 the presence status is changed to "away" and the mood message reads "In meetings from 12:30 pm".

The second appointment for the user starts at 12:30 pm and lasts for 2 hours, and is immediately followed by the third appointment which lasts for 1.5 hours.

The user therefore is not free again until 4:00 pm. The client 316 takes this into account and changes the presence status to "DND" and the mood message reads "In meetings until 4:00 pm". Note that the client gives the time which the user is free, not the time of the end of the first appointment only. Also note that the client 316 generates the mood message such that it indicates a plurality of meetings before the user is free again (i.e. it states "in meetings . . ." rather than "in a meeting . . ."). This therefore indicates to the contact's of the user that the user has more than one meeting scheduled.

At 4:00 pm, the user becomes free again, and the presence status is set to "away" and the mood message reads "Free from 4:00 pm". The next appointment is scheduled for 5:00 pm, so at 4:15 pm the presence state is changed to "online" and the mood message reads "Free until 5:00 pm". At 4:45 pm the client 316 changes the presence status to "away" and the mood message is changed to "In a meeting from 5:00 pm". At 5:00 pm a one hour appointment is scheduled, and therefore the presence state is updated to "DND" and the mood message to "In a meeting until 6:00 pm". At 6:00 pm, the presence status is changed to "away" and the mood message reads "Free from 6:00 pm". From 6:15 pm onwards the user is free. No more appointments are scheduled for that day, so the presence state is set to "online" and no mood message is generated.

In further embodiments, the client can perform more advanced analysis of the text of the schedule data. For example, in the illustrative case of FIG. 6, the mood message set when the user was busy always reads "In (a) meeting(s)". However, the user may not always be in a meeting when he has an appointment. The client can therefore attempt to interpret the schedule data and classify an appointment accordingly. For example, the client may search for specific terms in the schedule, such as "meeting", "lunch", "holiday", "conference", etc. These can be used to generate more specific mood messages accordingly. For example, the mood messages can read "In a meeting until . . . ", "At lunch until . . . ", "On holiday until . . . ", and "At a conference until . . . ". Many other possible classifications of appointment are also possible. The different classifications to search for can, in further embodiments, also be user-defined by the user of the client 316 in order to be more accurately tailored to the user's particular job, lifestyle or schedule.

While this invention has been particularly shown and described with reference to preferred embodiments, it will be understood to those skilled in the art that various changes in form and detail may be made without departing from the scope of the invention as defined by the appendant claims. For example, it will be appreciated that embodiments of the invention described herein can be employed in an IM system, a VoIP system, a video call system or any combination thereof. The user terminals (104, 116) on which the communication client is running can be mobile devices or fixed terminals, and these user terminals can connect to the communication network 106 via intermediate networks (such as mobile networks, WLAN networks or corporate networks). Furthermore, the precise combination of presence states used in the preferred embodiments can also be changed. For example, only a selection between "online" and "DND" (as in FIG. 4) can be combined with extended presence information provided in the mood messages. Alternatively, only one of the two types of "away" setting could be used (i.e. either imminently before or just after an appointment). It will also be understood that the particular naming and type of presence states selected (e.g. "DND", "away", etc) can be changed as appropriate for the system in which the invention is implemented.

According to the invention in certain embodiments there is provided a user terminal as herein described having the following features.

The communication client may be arranged to search the storage means for schedule data prior to analysing the schedule data.

The processor may be configured to execute a calendar application, wherein the calendar application is arranged to receive schedule data entered by the user of the user terminal and store the schedule data on the storage means.

The terminal may comprise a display means, wherein the communication client is arranged to update a user interface displaying the selected availability setting on the display means.

The communication client may be arranged to periodically access the schedule data, analyse the schedule data, and map the current status of the user to a selected one of a group of predefined availability settings.

The communication client may be arranged to determine if the current status of the user is busy, and if so select an availability setting which prevents the user from being notified of incoming communication events, and determine if the current status of the user is free, and if so select an availability setting which permits the user to be notified of incoming communication events.

The communication client may be arranged to determine if the schedule data indicates that the current status of the user is scheduled to change within a predefined time period, and if so select an availability status which permits the user to be notified of incoming communication events and indicates limited availability of the user of the user terminal.

The communication client may be arranged to determine if the schedule data indicates that the current status of the user has changed within a predefined time period, and if so select an availability status which permits the user to be notified of incoming communication events and indicates limited availability of the user of the user terminal.

The communication client may be arranged to generate text data to augment the selected availability setting, and the message transmitted to the at least one further user terminal may further comprise the text data.

The text data may comprise a time at which the current status of the user is next scheduled to change.

The text data may comprise a time at which the current status of the user has changed.

The communication client may be further arranged to analyse the schedule data to determine a classification of the current status of the user, and wherein the text data comprises the classification.

The communication client may be arranged to transmit the message comprising the selected availability setting responsive to a request message being received from at least one further user terminal.

The communication client may be arranged to transmit the message comprising the selected availability setting at periodic intervals.

The communication network may be a packet-based communication network.

The communication network may be a voice over internet protocol network.

The communication network is an instant messaging network.

The communication network may be a peer-to-peer communication network.

The invention claimed is:

1. A method of distributing availability information from a first user terminal for receipt by at least one further user terminal connected via a communication network, the method comprising:
    accessing schedule data stored on a storage means relating to a user of the first user terminal;
    analysing the schedule data to determine a current status of the user;
    mapping the current status of the user to a selected one of a group of predefined availability settings, wherein the step of mapping comprises determining if the schedule data indicates that the current status of the user is scheduled to change in the future within a predefined time period, and if so, selecting an availability setting for the predefined time period before the scheduled change which indicates an availability status of the user of the first user terminal during the predefined time period before the scheduled change and which is different than the current status of the user; and transmitting a message comprising the selected availability setting over the communication network for receipt by the at least one further user terminal, the message further including an indication of the availability status of the user of the first user terminal during the predefined time period before the scheduled change and an indication of how the current status of the user will change in the future, the indication being configured to be displayed via the at least one further user terminal during the predefined time period before the scheduled change.

2. A method according claim 1, further comprising the step of searching the storage means for schedule data prior to the step of analysing.

3. A method according to claim 1, further comprising the steps of: receiving schedule data entered into a calendar application executed at the first user terminal from the user of the first user terminal; and the calendar application storing the schedule data on the storage means.

4. A method according to claim 1, further comprising the step of updating a user interface of a communication client to display the selected availability setting.

5. A method according to claim 1, wherein the steps of accessing, analysing and mapping are performed periodically.

6. A method according to claim 1, wherein the step of mapping comprises the steps of: determining if the current status of the user is busy, and if so selecting an availability setting which prevents the user from being notified of incoming communication events; and determining if the current status of the user is free, and if so selecting an availability setting which permits the user to be notified of incoming communication events.

7. A method according to claim 1, wherein the step of mapping comprises the step of:

determining if the schedule data indicates that the current status of the user has changed within a predefined time period, and if so selecting an availability setting which permits the user to be notified of incoming communication events and indicates limited availability of the user of the first user terminal.

8. A method according to claim 1, wherein the indication of how the current status of the user will change comprises text data.

9. A method according claim 8, wherein the text data comprises a time at which the current status of the user is next scheduled to change.

10. A method according claim 8, wherein the text data comprises a time at which the current status of the user has changed.

11. A method according to claim 8, further comprising the step of analysing the schedule data to determine a classification of the current status of the user, and wherein the text data further comprises the classification.

12. A method according to claim 1, wherein the step of transmitting is performed responsive to a request message received from the at least one further user terminal.

13. A method according to claim 1, wherein the step of transmitting is performed at periodic intervals.

14. A method according to claim 1, wherein the communication network is a packet-based communication network.

15. A method according to claim 1, wherein the communication network is a voice over internet protocol network.

16. A method according to claim 1, wherein the communication network is an instant messaging network.

17. A method according to claim 15, wherein the communication network is a peer-to-peer communication network.

18. A computer program product comprising program code means which, when executed by a computer implement steps comprising:

accessing schedule data stored on a storage means relating to a user of a first user terminal;

analysing the schedule data to determine a current status of the user;

mapping the current status of the user to a selected one of a group of predefined availability settings, wherein the step of mapping comprises determining if the schedule data indicates that the current status of the user is scheduled to change in the future within a predefined time period, and if so, selecting an availability setting for the predefined time period before the scheduled change which indicates an availability status of the user of the first user terminal during the predefined time period before the scheduled change and which is different than the current status of the user; and transmitting a message comprising the selected availability setting over the communication network for receipt by at least one further user terminal, the message further including an indication of the availability status of the user of the first user terminal during the predefined time period before the scheduled change and an indication of how the availability status of the user will change in the future, the indication being configured to be displayed via the at least one further user terminal during the predefined time period before the scheduled change.

19. A user terminal comprising:

a storage means; and a processor configured to execute a communication client, wherein the communication client is configured to be executed by the processor to:

allow a user of the user terminal to establish communications with at least one further user terminal via a packet-based communication network;

access schedule data stored on the storage means relating to the user of the user terminal, analyse the schedule data to determine a current status of the user, map the current status of the user to a selected one of a group of predefined availability settings, and transmit a message comprising the selected availability setting over the communication network for receipt by the at least one further user terminal; and determine if the schedule data indicates that the current status of the user is scheduled to change in the future within a predefined time period, and if so:

select an availability status of the user for the predefined time period which is different than a current status of the user;

select a status message for the predefined time period before the scheduled change which includes an indication of how the current status of the user will change in the future;

and transmit the availability status and the status message for receipt and display via the at least one further user terminal during the predefined time period.

20. A user terminal as recited in claim 19, wherein the communication client is configured to be executed by the processor to enable the availability status of the user for the predefined time period to be user-configurable.

* * * * *